United States Patent [19]

Michno

[11] Patent Number: 5,492,196

[45] Date of Patent: Feb. 20, 1996

[54] PORTABLE DEER CART AND TREE STAND

[76] Inventor: John L. Michno, 3 Starview Dr., Neshanic Station, N.J. 08853

[21] Appl. No.: 350,457

[22] Filed: Dec. 7, 1994

[51] Int. Cl.$^6$ .................................................. A01M 31/02
[52] U.S. Cl. .............................................. 182/20; 182/187
[58] Field of Search .................................... 182/187, 188, 182/116, 20

[56] References Cited

U.S. PATENT DOCUMENTS

| | | | |
|---|---|---|---|
| 4,120,379 | 10/1978 | Carter | 182/187 |
| 4,321,982 | 3/1982 | Streckland | 182/20 |
| 4,475,627 | 10/1984 | Eastridge | 182/187 |
| 4,667,773 | 3/1987 | Davis | 182/187 |

*Primary Examiner*—Alvin C. Chin-Shue

[57] ABSTRACT

A new and improved portable deer cart and tree stand comprising a flooring section. The flooring section has two support brackets each having a first end and a second end. Each first end is integral with opposing sides of the front end. Each of the two support brackets has securement bolts integral with side portions thereof. Included in the device is a generally U-shaped treestand seat having two leg portions, two intermediate portions, and a seat portion. The two leg portions are pivotally secured to the two sides of the flooring section. The seat portion has a securement hoop theresecured. Included in the device are two support brackets each having a first end and a second end. Each first end is coupled with the two intermediate portions of the treestand seat. Each second end is optionally coupled with the securement bolts of the two support brackets of the flooring section in a tree stand configuration. A tree strap has a hook therefrom. The strap surrounds a tree with the hook coupled with the securement hoop of the tree stand. The tree strap serves to mount the tree stand to the tree.

6 Claims, 3 Drawing Sheets

PORTABLE DEER CART AND TREE STAND

BACKGROUND OF THE INVENTION

1. Field of the Invention

The present invention relates to a portable deer cart and tree stand and more particularly pertains to providing a means for transporting game and a platform for a tree with a portable deer cart and tree stand.

2. Description of the Prior Art

The use of tree stands and game carriers is known in the prior art. More specifically, tree stands and game carriers heretofore devised and utilized for the purpose of providing a platform for trees and a means for carrying game are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,064,020 to Eagleson discloses a device for hunting large and small game.

U.S. Pat. No. 4,582,165 to Latini discloses a pack frame and tree stand.

U.S. Pat. No. 4,321,982 to Strickland discloses a tree climbing-hunting and game cart device.

U.S. Pat. No. 4,045,040 to Fails discloses a deer stand and game carrier.

U.S. Pat. No. 3,907,323 to Knapp et al. discloses a game cart.

U.S. Pat. No. 3,430,972 to Fiedler discloses a combined stepladder-cart.

While these devices fulfill their respective, particular objective and requirements, the aforementioned patents do not describe a portable deer cart and tree stand for providing a means for transporting game and a platform for a tree.

In this respect, the portable deer cart and tree stand according to the present invention substantially departs from the conventional concepts and designs of the prior art, and in doing so provides an apparatus primarily developed for the purpose of providing a means for transporting game and a platform for a tree.

Therefore, it can be appreciated that there exists a continuing need for new and improved portable deer cart and tree stand which can be used for providing a means for transporting game and a platform for a tree. In this regard, the present invention substantially fulfills this need.

SUMMARY OF THE INVENTION

In the view of the foregoing disadvantages inherent in the known types of tree stands and game carriers now present in the prior art, the present invention provides an improved portable deer cart and tree stand. As such, the general purpose of the present invention, which will be described subsequently in greater detail, is to provide a new and improved portable deer cart and tree stand and method which has all the advantages of the prior art and none of the disadvantages.

To attain this, the present invention essentially comprises a flooring section having an upper surface, a lower surface, a front end, a back end, and two sides. The flooring section has two support brackets each having a first end and a second end. Each first end is integral with opposing sides of the front end. Each second end has an upwardly extending receiving tube integral therewith. Each receiving tube has an aperture formed therethrough. Each of the two support brackets has securement bolts integral with side portions thereof. The device contains an axle having two end portions. The axle is secured to the lower surface of the flooring section with the two end portions extending outwardly of the two sides of the flooring section. The device contains two tires. Each of the two tires is removably coupled with the two end portions of the axle. The device contains a U-shaped handle having two extending portions. Each of the two extending portions has an aperture formed therethrough. The two extending portions are removably received within the receiving tubes of the flooring section with the associated apertures in alignment. The U-shaped handle is secured within the receiving tubes by pins. Each of two extending portions has securement apertures therethrough. The device contains a generally U-shaped treestand seat having two leg portions, two intermediate portions, and a seat portion. The two leg portions are pivotally secured to the two sides of the flooring section. The seat portion has a securement hoop theresecured. The device contains two support brackets each having a first end and a second end. Each first end is coupled with the two intermediate portions of the treestand seat. Each second end is optionally coupled with the securement bolts of the two support brackets of the flooring section in a tree stand configuration or with the securement apertures of the two extending portions of the U-shaped handle in a cart configuration. The device contains two straps and two buckles. Each of the two straps is secured to the upper surface of the two sides of the flooring section. Each of the two buckles is secured to the opposing side of the flooring section. The two straps and two buckles serve to couple together around game for ease of transportation. The device contains a tree strap having a hook therefrom. The strap surrounds a tree with the hook coupled with the securement hoop of the tree stand. The tree strap serves to mount the tree stand to the tree.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable deer cart and tree stand which has all the advantages of the prior art tree stands and game carriers and none of the disadvantages.

It is another object of the present invention to provide a new and improved portable deer cart and tree stand which may be easily and efficiently manufactured and marketed.

It is a further object of the present invention to provide a new and improved portable deer cart and tree stand which is of durable and reliable construction.

An even further object of the present invention is to provide a new and improved portable deer cart and tree stand which is susceptible of a low cost of manufacture with regard to both materials and labor, and which accordingly is then susceptible of low prices of sale to the consuming public, thereby making such a portable deer cart and tree stand economically available to the buying public.

Still yet another object of the present invention is to provide a new and improved portable deer cart and tree stand which provides in the apparatuses and methods of the prior art some of the advantages thereof, while simultaneously overcoming some of the disadvantages normally associated therewith.

Even still another object of the present invention is to provide a new and improved portable deer cart and tree stand for providing a means for transporting game and a platform for a tree.

Lastly, it is an object of the present invention to provide a new and improved portable deer cart and tree stand comprising a flooring section having an upper surface, a lower surface, a front end, a back end, and two sides. The flooring section has two support brackets each having a first end and a second end. Each first end is integral with opposing sides of the front end. Each of the two support brackets has securement bolts integral with side portions thereof. Included in the device is a generally U-shaped treestand seat having two leg portions, two intermediate portions, and a seat portion. The two leg portions are pivotally secured to the two sides of the flooring section. The seat portion has a securement hoop theresecured. Included in the device are two support brackets each having a first end and a second end. Each first end is coupled with the two intermediate portions of the treestand seat. Each second end is optionally coupled with the securement bolts of the two support brackets of the flooring sectioning a tree stand configuration. A tree strap has a hook therefrom. The strap surrounds a tree with the hook coupled with the securement hoop of the tree stand. The tree strap serves to mount the tree stand to the tree.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
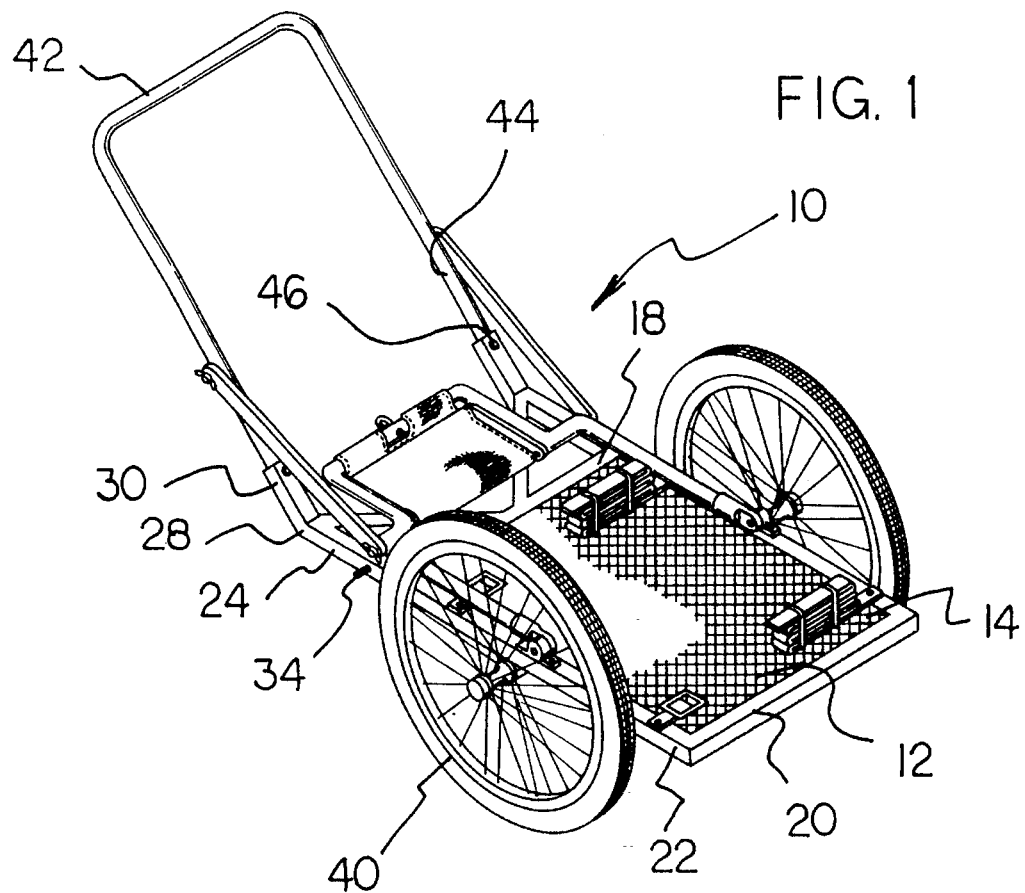
FIG. 1 is a perspective view of the preferred embodiment of the portable deer cart and tree stand constructed in accordance with the principles of the present invention.
Figure 2:
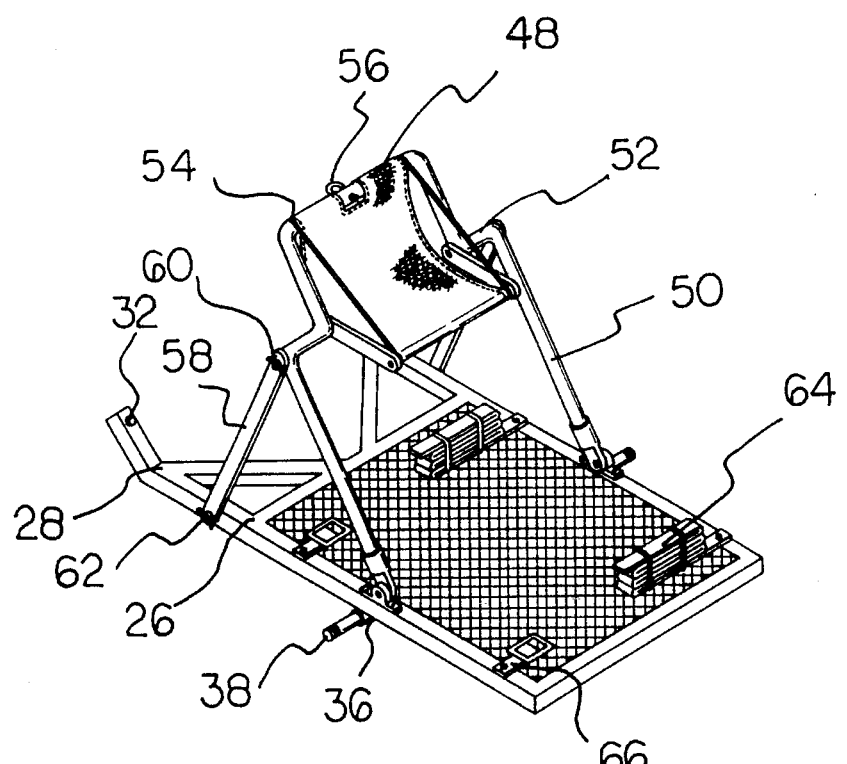
FIG. 2 is a perspective view of the present invention in the tree stand configuration.
Figure 3:
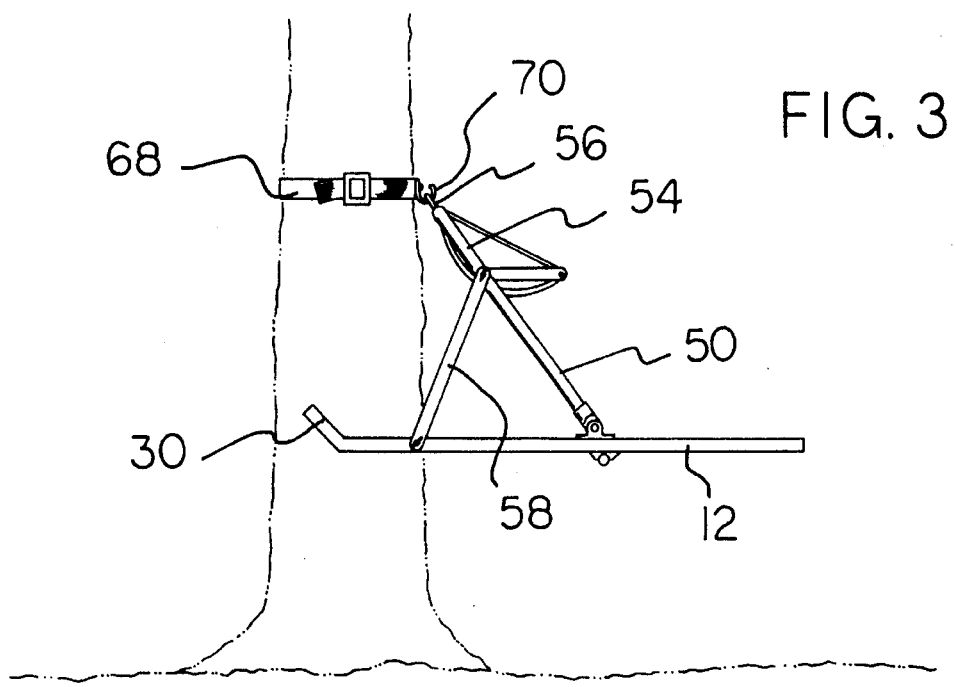
FIG. 3 is an elevated side view of the present invention strapped to a tree.
Figure 4:
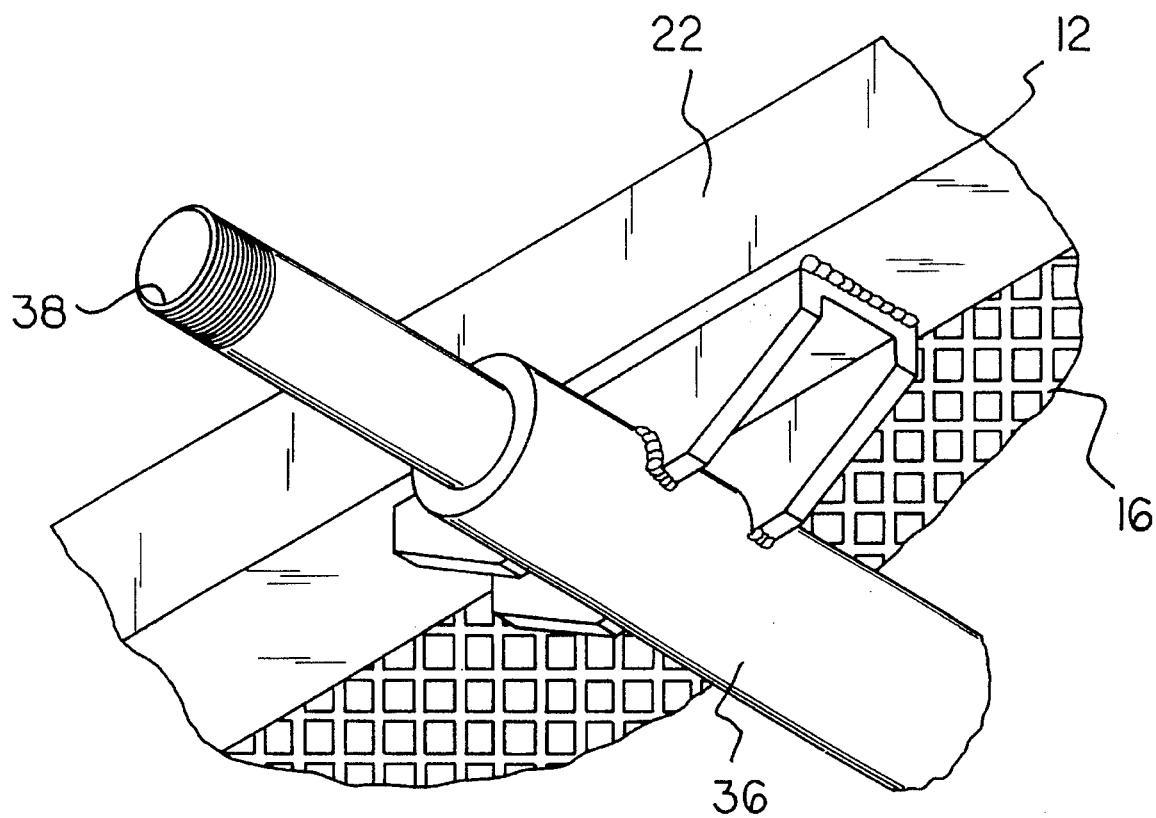
FIG. 4 is an enlarged partial view of the axle secured to the flooring section.
Figure 5:
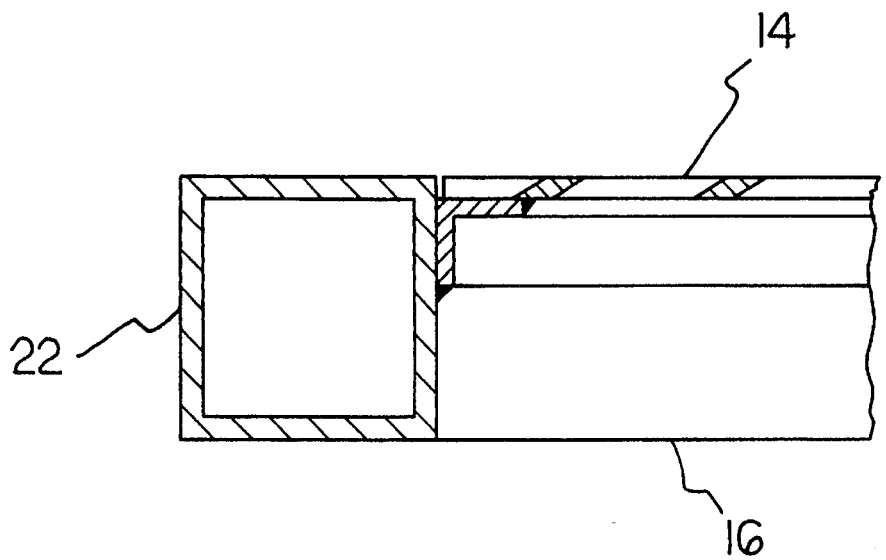
FIG. 5 is a cross-sectional view of the flooring platform.
Figure 6:
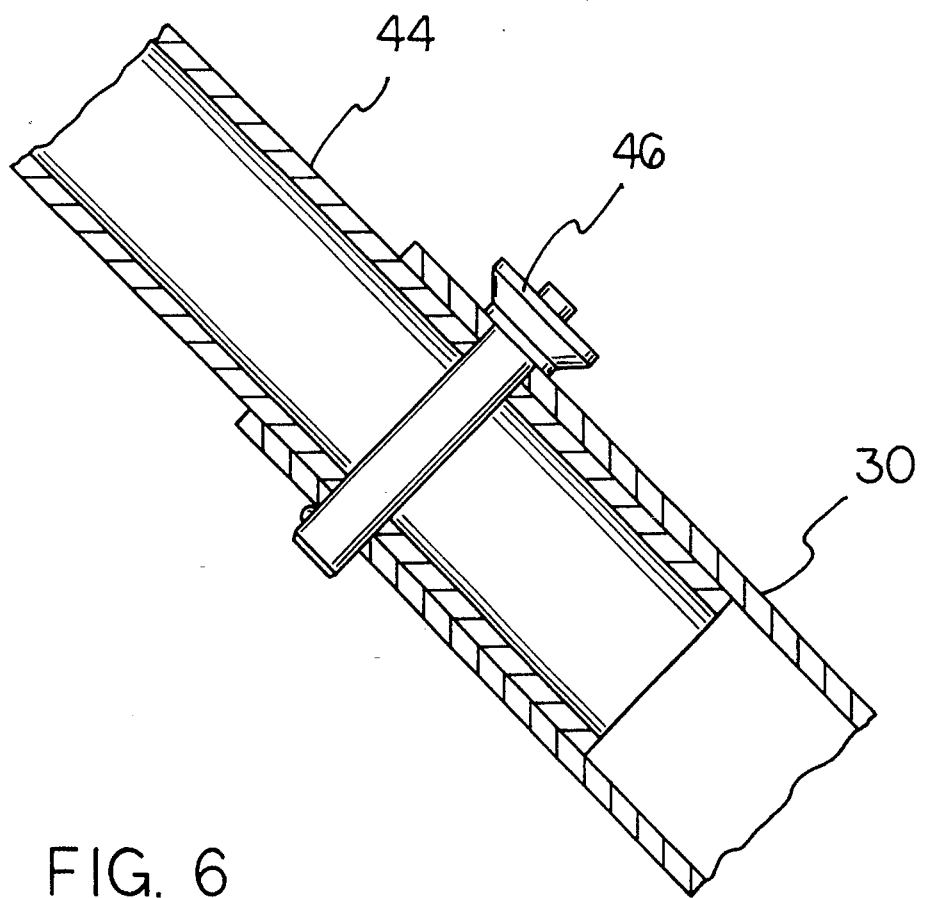
FIG. 6 is a cross-sectional view of the adjustable-length cart handle.

With reference now to the drawings, and in particular, to FIG. 1 thereof, the preferred embodiment of the new and improved portable deer cart and tree stand embodying the principles and concepts of the present invention and generally designated by the reference number 10 will be described.

Specifically, it will be noted in the various Figures that the device relates to a new and improved portable deer cart and tree stand for providing a means for transporting game and a platform for a tree. In its broadest context, the device consists of a flooring section, an axle, two tires, a U-shaped handle, a treestand seat, two straps and two buckles, and a tree strap.

The device 10 contains a flooring section 12 having an upper surface 14, a lower surface 16, a front end 18, a back end 20, and two sides 22. The front end 18, the back end 20, and the two sides 22 are constructed of square tubing. The upper surface 14 and the lower surface 16 are constructed of a grated material. The flooring section 12 has two support brackets 24 each having a first end 26 and a second end 28. Each first end 26 is integral with opposing sides of the front end 18. Each second end 28 has an upwardly extending receiving tube 30 integral therewith. Each receiving tube 30 has an aperture 32 formed therethrough. Each of the two support brackets 24 has securement bolts 34 integral with side portions thereof.

The device 10 contains an axle 36 having two end portions 38. The axle 36 is secured to the lower surface 16 of the flooring section 12 with the two end portions 38 extending outwardly of the two sides 22 of the flooring section 12.

The device 10 contains two tires 40. Each of the two tires 40 is removably coupled with the two end portions 38 of the axle 36. The tires 40 can be either 21" or 26". These are the sizes that are designed for use with the two end portions 38 of the axle 36. The two tires 40 can be easily removed when the tree stand option of the device 10 is needed.

The device 10 contains a U-shaped handle 42 having two extending portions 44. Each of the two extending portions 44 has an aperture formed therethrough. The two extending portions 44 are removably received within the receiving tubes 30 of the flooring section 12 with the associated apertures in alignment. The U-shaped handle 42 is secured within the receiving tubes 30 by pins 46. Each of two extending portions 44 has securement apertures therethrough. The pins 46 can be quickly discharged to remove the U-shaped handle 42 from the receiving tubes 30 when the tree stand of the device 10 is needed.

The device 10 contains a generally U-shaped treestand seat 48 having two leg portions 50, two intermediate portions 52, and a seat portion 54. The two leg portions 50 are pivotally secured to the two sides 22 of the flooring section 12. The seat portion 54 has a securement hoop 56 theresecured. The treestand seat 48 can be easily folded in between the two support brackets 24 of the flooring section 12 when the device 10 is positioned as the deer cart.

The device 10 contains two support brackets 58 each having a first end 60 and a second end 62. Each first end 60 is coupled with the two intermediate portions 52 of the treestand seat 48. Each second end 62 is optionally coupled with the securement bolts 34 of the two support brackets 24 of the flooring section 12 in a tree stand configuration or with the securement apertures of the two extending portions 44 of the U-shaped handle 42 in a cart configuration. The two support brackets 58 can be easily changed from the tree stand configuration to the cart configuration.

The device 10 contains two straps 64 and two buckles 66. Each of the two straps 64 is secured to the upper surface 14 of the two sides 22 of the flooring section 12. Each of the two buckles 66 is secured to the opposing side of the flooring section 12. The two straps 64 and two buckles 66 serve to couple together around game for ease of transportation. When a user needs to transport a deer that they have just hunted, having the deer strapped down makes it much easier for the transportation to occur.

The device 10 contains a tree strap 68 having a hook 70 therefrom. The strap 68 surrounds a tree with the hook 70 coupled with the securement hoop 56 of the treestand seat. The tree strap 68 serves to mount the device to the tree. The tree strap 68 safely secures the device 10 around a trunk of the tree, so that the user can be elevated in the tree.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A portable deer cart and tree stand for providing a means for transporting game and a platform for a tree comprising, in combination:

a flooring section having an upper surface, a lower surface, a front end, a back end, and two sides, the flooring section having two support brackets each having a first end and a second end, each first end integral with opposing sides of the front end, each second end having an upwardly extending receiving tube integral therewith, each receiving tube having an aperture formed therethrough, each of the two support brackets having securement bolts integral with side portions thereof;

an axle having two end portions, the axle secured to the lower surface of the flooring section with the two end portions extending outwardly of the two sides of the flooring section;

two tires, each of the two tires removably coupled with the two end portions of the axle;

a U-shaped handle having two extending portions, each of the two extending portions having an aperture formed therethrough, the two extending portions removably received within the receiving tubes of the flooring section with the associated apertures in alignment, the U-shaped handle secured within the receiving tubes by pins, each of two extending portions having securement apertures therethrough;

a generally U-shaped treestand seat having two leg portions, two intermediate portions, and a seat portion, the two leg portions pivotally secured to the two sides of the flooring section, the seat portion having a securement hoop theresecured;

two support braces each such brace having a first end and a second end, each first end coupled with the two intermediate portions of the treestand seat, each second end optionally coupled with the securement bolts of the two support brackets of the flooring section in a tree stand configuration or with the securement apertures of the two extending portions of the U-shaped handle in a cart configuration;

two straps and two buckles, each of the two straps secured to the upper surface of one of the two sides of the flooring section, each of the two buckles secured to the opposing side of the flooring section, the two straps and two buckles serving to couple together around game for ease of transportation;

a tree strap having a hook therefrom, the strap surrounding a tree with the hook coupled with securement hoop of the treestand seat, the tree strap serving to mount the device to the tree.

2. A portable deer cart and tree stand for providing a means for transporting game and a platform for a tree comprising, in combination:

a flooring section having an upper surface, a lower surface, a front end, a back end, two sides, the flooring section having two support brackets each having a first end and a second end, each first end integral with opposing sides of the front end, each of the two support brackets having securement bolts integral with side portions thereof;

a generally U-shaped tree stand seat having two leg portions, two intermediate portions, and a seat portion, the two leg portions pivotally secured to the two sides of the flooring section, the seat portion having a securement hoop secured thereto;

two support braces each such braces having a first end and a second end, each first end coupled with the two intermediate portions of the tree stand seat, each second end optionally coupled with the securement bolts of the two support brackets of the flooring section in a tree stand configuration;

a tree strap having a hook therefrom, the strap surrounding a tree with the hook coupled with securement hoop of the tree stand seat, the tree strap serving to mount the device to the tree; and receiving tubes integral with each second end of the two support brackets of the flooring section, each of the receiving tubes having an aperture formed therethrough.

3. The device as described in claim 2 and further including a U-shaped handle having two extending portions, each of the two extending portions having an aperture formed therethrough, the two extending portions removably received within the receiving tubes of the flooring section with the associated apertures in alignment, the U-shaped handle secured within the receiving tubes by pins, each of two extending portions having securement apertures therethrough, the securement apertures optionally coupling with each second end of the two support brackets to form a cart configuration.

4. The device as described in claim 3 and further including an axle having two end portions, the axle secured to the lower surface of the flooring section with the two end portions extending outwardly of the two sides of the flooring section.

5. The device as described in claim 4 and further including two tires, each of the two tires removably coupled with the two end portions of the axle.

6. The device as described in claim 5 and further including two straps and two buckles, each of the two straps secured to the upper surface of one of the two sides of the flooring section, each of the two buckles secured to the opposing side of the flooring section, the two straps and two buckles serving to couple together around game for ease of transportation.

* * * * *